United States Patent [19]

Motokawa et al.

[11] 3,876,622

[45] Apr. 8, 1975

[54] PROCESS FOR THE PREPARATION OF AZODICARBONAMIDES MODIFIED WITH METALLIC COMPOUNDS

[75] Inventors: Hiroshi Motokawa; Teruo Hayashi; Hideki Kohara, all of Kuze-gun, Japan

[73] Assignee: Eiwa Chemical Industrial Company, Limited, Kyoto, Japan

[22] Filed: Aug. 17, 1973

[21] Appl. No.: 389,174

[30] Foreign Application Priority Data

Aug. 24, 1972  Japan................................ 47-85179

[52] U.S. Cl............. 260/149; 260/2.5 HA; 260/192
[51] Int. Cl........................................... C07c 107/02
[58] Field of Search............................ 260/192, 149

[56] References Cited
UNITED STATES PATENTS 3,111,496  11/1963  Hunter et al..................... 260/192 X
3,366,622  1/1968  Challinor et al.................. 260/192

*Primary Examiner*—Henry R. Jiles
*Assistant Examiner*—Robert W. Ramsuer
*Attorney, Agent, or Firm*—Armstrong, Nikaido & Wegner

[57] ABSTRACT

Modified azodicarbonamides suitable for use as a blowing agent for high molecular substances having low softening points are prepared by oxidizing hydrazodicarbonamide in aqueous suspension by means of hydrogen peroxide in the presence of a bromine compound, an acid and, a sulfate, nitrate, chloride or oxide of at least one metal selected from the group consisting of chromium, manganese, zinc, cobalt, nickel, tungsten, aluminum and tin to incorporate the said metallic compound into crystals of azodicarbonamide thus formed.

11 Claims, No Drawings

PROCESS FOR THE PREPARATION OF AZODICARBONAMIDES MODIFIED WITH METALLIC COMPOUNDS

This invention relates to a process for the preparation of modified azodicarbonamides and, in particular, to a process for modifying the chemical blowing agent capacity of azodicarbonamide for plastics and rubbers by carrying out the synthesis of azodicarbonamide in the presence of a compound of at least one metal selected from the group consisting of chromium, manganese, zinc, cobalt, nickel, tungsten, aluminum and tin as to form crystals of azodicarbonamide incorporated with the said metallic compound.

Azodicarbonamide has up to now been employed widely as a chemical blowing agent for plastics and rubbers and has been regarded as an excellent blowing agent because it yields gaseous nitrogen abruptly upon heating, its thermal decomposition products are noninflammable and it is nontoxic.

However, this compound has a too high thermal decomposition temperature, the purified product decomposing at 230°C; therefore, there has been disclosed in United States Patent Specification No. 2,804,435, to add thereto 1 to 5% by weight of hydrazodicarbonamide in order to lower the decomposition temperature to 205°C. However, the lowered decomposition temperature is still too high when the mixture is used as a blowing agent. For instance, when azodicarbonamide is used as a blowing agent for rubber, polyethylene, ethylene-vinyl acetate copolymers, polyvinyl chloride and similar high molecular weight materials of low softening points, it is difficult to attain compatability between the rate of softening of the high molecular material and the rate of gas generation by the blowing agent and, therefore, there occurs deterioration, scorching or ageing of the high molecular material and such results disadvantageously restricts the application field of the compound as blowing agent.

Recently, the problem of high decomposition temperature of azodicarbonamide blowing agent has been countered by using a biurea, urea, metallic stearate, dibutyltin maleate or like compound as a blowing aid or by applying chromium salt to the surfaces of crystal of azodicarbonamide to adjust the decomposition temperature. However, the decomposition temperature can be adjusted only to a certain extent by addition of such a blowing assistant, and the effect is not sufficient and uniform throughout a mass of a high molecular material in which it is incorporated because both the blowing agent and the blowing assistant are diluted by the high molecular material. It is difficult to obtain an expanded body having a uniform fine cellular or porous structure by increasing the amount of the blowing assistant added because the increased amount of the blowing assistant makes the cellular or porous structure fragile and has adverse effects on the properties of the expanded body thus formed.

It has previously been known that azodicarbonamide is prepared by oxidizing hydrazodicarbonamide and the recent industrial oxidation processes are roughly classified into a bichromate oxidation process and a chlorine oxidation process. Among these two processes, the former is superior to the latter in that the azodicarbonamide prepared in the former process has some better properties for use as a blowing agent for low softening materials compared with that prepared in the latter process. Unfortunately, the former process yields as an undesirable by-product considerable chromium sulfate containing sulfuric acid and, therefore, needs a large scale apparatus and a treating agent for treatment of the waste liquor, both of which make the former process more expensive than the latter. The latter process is more advantageous than the former in cost, while, on the other hand, it yields an azodicarbonamide which is unsuitable for use as a blowing agent for high molecular materials of low softening points because of its high decomposition temperature.

Accordingly, an object of the present invention is to provide a process for the preparation of modified azodicarbonamide.

Another object of the present invention is to provide a process for the preparation of modified azodicarbonamides having a lowered decomposition temperature.

A further object of the present invention is to provide a process for the preparation of chemical blowing agents having low decomposition temperatures.

A still further object of the present invention is to provide a process for the preparation of azodicarbonamide for use as a chemical blowing agent without accompanying discharge of a harmful waste liquor.

In accordance with the process of the present invention, azodicarbonamide is prepared by oxidizing hydrazodicarbonamide in aqueous suspension by means of hydrogen peroxide in the presence of (1) a bromine compound, (2) an acid and (3) a sulfate, nitrate, chloride or oxide of at least one metal selected from the group consisting of chromium, manganese, zinc, cobalt, nickel, tungsten, aluminum and tin to form crystals of azodicarbonamide incorporated with the aforesaid metallic compound. Thus, it has been made possible to obtain azodicarbonamide possessing the necessary properties as a chemical blowing agent for low softening high molecular materials without any discharge of harmful waste matter and the use of a treating installation therefor.

The metallic compound used in the process of the present invention includes the sulfates, nitrates, chlorides and oxides of chromium, manganese, zinc, cobalt, nickel, tungsten, aluminum and tin. Among these, the compounds of chromium, manganese, cobalt, zinc, nickel and tungsten are particularly effective, and the most effective are the compounds of chromium, manganese and zinc. The sulfates also include such double salts as alum. Representative examples of the metallic salt are: chromium sulfate, manganese sulfate, zinc sulfate, cobalt sulfate, nickel sulfate, tungsten sulfate, tin sulfate, aluminum sulfate alum, chromium alum, chromium nitrate, manganese nitrate, zinc nitrate, cobalt nitrate, nickel nitrate, tungsten nitrate, tin nitrate, aluminum nitrate, chromium chloride, manganese chloride, zinc chloride, cobalt chloride, nickel chloride, tungsten chloride, tin chloride, aluminum chloride, chromium oxide, manganese oxide, zinc oxide, cobalt oxide, nickel oxide, tungsten oxide, tin oxide and aluminum oxide.

The concentration of the metallic compound in the oxidation system is a significant factor and is 0.1 to 50% by weight; more desirably of 0.1 to 5% by weight for a water-insoluble compound and 15 to 50% by weight for a water-soluble compound. The concentration of the metallic compound is influenced to a large extent by adjustment of the acid concentration in the oxidation system. The amount of the metallic compound incorporated in crystals of azodicarbonamide can be adjusted by adjusting the respective concentrations of the compound and acid, thereby controlling the decomposition temperature of the product. In Table 1 and 2 hereinafter set forth, there are shown, for illustration, the variations of decomposition temperatures and ash content with variation in concentration of chromium sulfate as the metallic compound and of sulfuric acid as the acid. The effect on azodicarbonamide obtained by the incorporation of a very small amount of the metallic compound in crystal and on the decomposition temperature of the modified azodicarbonamide thus obtained vary depending on the nature of the metallic compound added and on the amount of the metallic compound. Therefore, it is necessary to appropriately select the desired properties of the modified azodicarbonamide according to the resin and other raw materials and working conditions.

As the bromine compound there may be used any bromine-containing compound which dissolves in water in an oxidation system to liberate bromine ion, such as, e.g., bromine; sodium bromide, potassium bromide, lithium bromide and like water-soluble metallic bromides; ammonium bromide; and quaternary ammonium bromide and like organic bromides, such as, e.g., tetramethyl ammonium bromide and tetraethyl ammonium bromide. The bromine compound is used in an amount of 0.1 to 5, preferably 0.5 to 2 parts by weight per 100 parts by weight of hydrazodicarbonamide, because an amount less than 0.1% by weight is insufficient for obtaining a noticeable effect while an amount exceeding 5% by weight brings about no additional useful effect.

As the hydrogen peroxide there may be used a commercially available 35 wt.% or 60 wt.% aqueous hydrogen peroxide as such or, if necessary, after adjusting its concentration. The hydrogen peroxide is used in an amount in usual of 1.0 to 2.0 moles, preferably of 1.05 to 1.5 moles per mole of hydrazodicarbonamide. In the process of the present invention only water is formed as a by-product during oxidation and there is not present any other impurity in the reaction system because of use of hydrogen peroxide as a sole oxidizing agent; thus, the reaction mixture after separation of the resulting crystals of azodicarbonamide may be reused after adjusting the concentration of ingredients. Thus, in the process of the present invention, it is unnecessary to carry out treatment of waste liquor as in the case of the bichromate oxidation process.

In the process of the present invention it is necessary to use an acid as a catalyst in addition to the bromine compound. Useful acids include strong mineral acids, such as hydrochloric acid, hydrobromic acid, nitric acid, phosphoric acid, sulfuric acid; and water soluble organic acids at least equal to acetic acid in strength, such as formic acid, acetic acid, propionic acid and maleic acid. The acid is used in a concentration of 5 to 45% by weight, preferably in a concentration of 5 by 15% by weight in case of hydrochloric acid, hydrobromic acid, phosphoric acid and nitric acid, 10 to 40% by weight in case of sulfuric acid and 5–20% by weight in case of water soluble organic acids. Since hydrogen bromide functions also as an acid it is unnecessary to add any other acid to the oxidation system when it is used as the bromine compound.

The concentration of hydrazodicarbonamide is not critical as long as there is formed a stirrable slurry, though the prefered concentration is 5 to 45%, more desirably 15 to 30% by weight.

The reaction temperature is an important factor for incorporation of the metallic compound into the crystals of azodicarbonamide, namely, formation of composite crystals of the metallic compound and azodicarbonamide, and ranges usually between 30°C and 85°C, preferably between 30°C to 60°C. In the following Table 3 there are shown, as an example, the variation in decomposition temperature and in ash content with the variation in reaction temperature in a reaction system using chromium sulfate and sulfuric acid. The reaction time ranges usually from 10 minutes to 10 hours, preferably from 30 minutes to 4 hours.

Thus, the amount of the metallic compound incorporated in crystals of azodicarbonamide, and, consequently, the ash content and decomposition temperature of the modified azodicarbonamide, are influenced to a large extent by the concentration of metallic compound and of acid in the reaction system and the reaction conditions, as shown in the following Tables 1 to 3.

TABLE 1

Influence of chromium sulfate concentration

| Chromium sulfate conc. | Decomposition temp. | Ash content |
|---|---|---|
| (wt.%) | (°C) | (wt.%) |
| 15.7 | 200.5 | 0.07 |
| 23.5 | 199 | 0.08 |
| 31.3 | 196 | 0.11 |
| 39.1 | 195 | 0.14 |
| $H_2SO_4$ conc. 20.6 wt.% | Reaction temp. (40 ± 1.5)°C | |

TABLE 2

Influence of $H_2SO_4$ concentration

| $H_2SO_4$ conc. | Decomposition temp. | Ash content |
|---|---|---|
| (wt.%) | (°C) | (wt.%) |
| 13.1 | 201 | 0.07 |
| 20.6 | 196 | 0.11 |
| 28.9 | 193 | 0.18 |
| 33.3 | 192.5 | 0.25 |
| Cr sulfate Conc. 31.3 wt.% | Reaction temp. (40± 1.5)°C | |

Table 3

Influence of reaction temperature

| Reaction temp. | Decomposition temp. | Ash content |
|---|---|---|
| (°C) | (°C) | (wt.%) |
| 30 ± 1.5 | 194 | 0.21 |
| 40 ± 1.5 | 196 | 0.11 |
| 50 ± 1.5 | 198 | 0.10 |
| 60 ± 1.5 | 199 | 0.08 |
| Cr sulfate conc. 31.3 wt.% | $H_2SO_4$ conc. 20.6 wt.% | |

With respect to the other useful metallic compounds, of course, although there are some differences in numerical value, similar trends were observed.

As mentioned above, since, in the process of the present invention for the preparation of azodicarbonamide by oxidation of hydrazodicarbonamide, the sole by-product formed during the process is water and no other impurity is formed, so that the reaction mixture after separation of the product can be re-used after a simple adjustment of ingredients by, e.g., concentrating. Accordingly, an installation for treatment of waste liquor such as required in the bichromate oxidation process is unnecessary. Further, there are obtained crystals of azodicarbonamide incorporated with a metallic compound, because of the presence of the metallic compound in the reaction system. Therefore, crystals of the modified azodicarbonamide prepared in the process of the present invention provide a smooth-surfaced expanded body having a uniform microporous or -cellular structure when used as a chemical blowing agent for rubbers, polyethylene, ethylene-vinyl acetate copolymers, polyvinyl chloride and similar high molecular substances having low softening points.

In the following examples, all parts and percentages are by weight unless otherwise designated.

EXAMPLE 1

In a mixture (spg 1.4585) of 705 g of a 40% aqueous chromium sulfate solution and 196 g of a 95% sulfuric acid there was suspended 236 g of hydrazodicarbonamide to form a slurry. There was then added thereto 1.6 g of bromine. To the resulting slurry there was added dropwise over 30 minutes 136 g of a 60% aqueous hydrogen peroxide with stirring. The reaction temperature was maintained at $(40 \pm 1.5)°C$. After completion of the addition of the aqueous hydrogen peroxide, stirring was continued for 1 hour 30 minutes and the reaction mixture was then filtered, washed with water and dried to obtain 228 g (98.5 mole % of theoretical yield) of azodicarbonamide of a decomposition temperature 196°C, an ash content 0.11% and a gas yield 225 ml/g (S.T.P.).

EXAMPLE 2

The filterate of the reaction mixture in Example 1 was concentrated to a specific gravity $d^{30} = 1.4585$ then there was suspended therein 236 g of hydrazodicarbonamide to form a slurry. To the slurry there was added 9 g of a 40% aqueous hydrogen bromide and then 136 g of a 60% aqueous hydrogen peroxide dropwise over 30 minutes with stirring. The reaction temperature was maintained at $(40 \pm 1.5)°C$. Thereafter, the mixture was stirred for additional 1 hour 30 minutes and then filtered to recover crystals which were washed with water and dried. Thus, there was obtained 228 g (98.5 mole % of theoretical yeild) of crystals of azodicarbonamide of a decomposition temperature 196°C, as ash content 0.11% and a gas yield 225 ml/g (S.T.P.), i.e., of the same quality as that obtained in Example 1.

EXAMPLE 3

In a mixture of 705 g of a 40% aqueous nickel nitrate solution and 196 g of a 95% sulfuric acid there was suspended 236 g of hydrazodicarbonamide to form a slurry. There was then added thereto 4.5 g of sodium bromide. To the resulting slurry there was added dropwise 136 g of a 60% aqueous hydrogen peroxide over 30 minutes with stirring. The reaction temperature was maintained at $(35 \pm 2.0)°C$. Stirring was continued for an additional 2 hours 30 minutes and, thereafter, the reaction mixture was filtered and the crystals thus recovered were washed with water and dried. Thus, there was obtained 228 g (98.5 mole % of theoretical yield) of a crystallized azodicarbonamide of a decomposition temperature of 201°C, as ash content of 0.15% and a gas yield of 195 ml/g (S.T.P.).

EXAMPLE 4

In a mixture of 718 g of water and 196 g of a 95% sulfuric acid there was dissolved 23.6 g of manganese dioxide. There was then suspended therein 236 g of hydrazodicarbonamide to form a slurry. The slurry was mixed with 5 g of ammonium bromide and then there was added dropwise, with stirring, 136 g of a 60% aqueous hydrogen peroxide over 1½ hours. The reaction temperature was maintained at $(35 \pm 5)°C$. After stirring for an additional 1½ hours, the mixture was filtered and the recovered crystals were washed with water and dried to obtain 228 g (98.5 mole % of theoretical yield) of a crystallized azodicarbonamide of a decomposition temperature of 201°C, as ash content of 0.2% and a gas yield of 225 ml/g (S.T.P.).

EXAMPLE 5

In a mixture of 500 g of a 40% aqueous cobalt chloride and 300 g of a 35% hydrochloric acid there was suspended 236 g of hydrazodicarbonamide to form a slurry. There was then added thereto 1.6 g of bromine. To the resulting slurry there was added dropwise 136 g of a 60% aqueous hydrogen peroxide over 1½ hours with stirring. The reaction temperature was maintained at $(30 \pm 1)°C$. After completion of the addition of the aqueous hydrogen peroxide, the reaction temperature was raised to 60°C and the stirring was continued for 1½ hours. The mixture was then filtered and the recovered crystals were washed with water and dried to obtain 222.8 g (96 mole % of theoretical yield) of a crystallized azodicarbonamide of a decomposition temperature of 203°C, an ash content of 0.10% and a gas yield of 194 ml/g (S.T.P.).

For comparison, the same procedure was repeated, except that there was not used any transition metal compound, to obtain 228 g (98.5 mole % of theoretical yield) of azodicarbonamide of a high decomposition temperature of 210°C, an ash content of 0.03% and a gas yield of 190 ml/g (S.T.P.).

EXAMPLE 6

The filtrate of the reaction mixture in Example 1 was concentrated to specific gravity of $d^{30} = 1.4585$, then there was suspended therein 236 g of hydrazodicarbonamide to form a slurry. To the slurry there was added 9 g of a 40% hydrobromic acid and then 136 g of a 60% aqueous hydrogen peroxide dropwise over 30 minutes with stirring. With the addition of the hydrogen peroxide dropwise over 30 minutes with stirring. With the addition of the hydrogen peroxide, the temperature of the reaction mixture was raised from 35°C to 60°C by heat of reaction. The stirring was continued for additional 1½ hours and the reaction mixture was then filtered to recover crystals, which were washed with water and dried to obtain 228 g of a crystalized azodicarbonamide (98.5 mole % of theoretical yield) of a decomposition temperature of 198°C, an ash content of 0.10% and a gas yield of 220 ml/g (S.T.P.).

EXAMPLE 7

In a mixture of 705 g of a 50% aqueous zinc chloride solution and 196 g of a 95% sulfuric acid there was suspended 236 g of hydrazodicarbonamide to form a slurry. There was then added thereto 1.6 g of bromine and subsequently 136 g of a 60% aqueous hydrogen peroxide dropwise over 1½ hours with stirring while maintaining the reaction temperature at (50 ± 2)°C. Thereafter, the stirring was continued for 1½ hours and the reaction mixture was then filtered to recover crystals which were then washed with water and dried to obtain 229 g (98.7 mole % of theoretical yield) of a crystallized azodicarbonamide of a decomposition temperature of 199°C, an ash content of 0.13% and a gas yield of 232 ml/g (S.T.P.).

EXAMPLES 8 to 16

In a mixture of 705 g of an aqueous metallic salt solution of a concentration, as indicated in the following Table 4, and 196 g of a 95% sulfuric acid there was suspended 236 g of hydrazodicarbonamide to form a slurry. There was then added thereto 1.6 g of bromine and subsequently 136 g of a 60% aqueous hydrogen peroxide dropwise over 30 minutes, with stirring. The reaction temperature was maintained at (40 ± 1.5)°C. Thereafter, the stirring was continued for 1½ hours and the reaction mixture was filtered to recover crystals which were then washed with water and dried.

The decomposition temperatures of various modified azodicarbonamides in the crystals thus obtained were as shown in the following Table 4.

parts of dioctyl phthalate, 3 parts of a heat stabilizer (organic Ca—Zn complex) and 3 parts of the azodicarbonamide prepared in Example 7. The sheet was applied to a base cloth and heated at 200°C for 90 seconds in an oven to obtain a 0.9 mm thick cellular polyvinyl chloride leather having a uniform fine cellular structure and being white in color.

When the same procedure was repeated, except that there was used an azodicarbonamide prepared in a conventional process, there was obtained an artificial leather which had uniform but coarse cellular structure and was completely light yellow in color.

What is claimed is:

1. A process for the preparation of azodicarbonamide having a metallic compound incorporated therein, said process consisting essentially of oxidizing hydrazodicarbonamide with hydrogen peroxide in the presence of (1) 0.1 or more parts by weight per 100 parts of said hydrazodicarbonamide of a bromine compound, said bromine compound being one which dissolves in water in an oxidation system to liberate bromine ion; (2) 5 to 45% by weight of an acid selected from the group consisting of hydrochloric acid, hydrobromic acid, nitric acid, phosphoric acid, sulfuric acid, formic acid, acetic acid, propionic acid and maleic acid and (3) 0.1 to 50% by weight of a sulfate, nitrate, chlo- Table 4

| Example Number | Metallic Compound | Concentration (%) | Decomposition Temp. (°C) |
|---|---|---|---|
| 8 | Chromium chloride | 12.8 | 198 |
| 9 | Chromium ammonium alum | 19.2 | 197 |
| 10 | Manganese chloride | 38.3 | 195 |
| 11 | Manganese nitrate | 51.1 | 195 |
| 12 | Zinc sulfate | 25.6 | 197 |
| 13 | Tungsten oxide WO₃ | 1.3 | 203 |
| 14 | Aluminum oxide | 1.3 | 204 |
| 15 | Aluminum chloride | 38.3 | 202 |
| 16 | Tin oxide SnO₂ | 1.3 | 204 |

EXAMPLE 17

Preparation of Polyethylene Foam

A blend of 100 parts of a high pressure polyethylene of a MI of 4 and a density of 0.918 with 1.0 part of dicumyl peroxide and 10.0 parts of the azodicarbonamide as prepared in Example 1 was thoroughly kneaded on a roll mill at 100° to 110°C and calendered into a 5 mm thick sheet. The sheet was heated in a salt bath at 200°C for 2 minutes to obtain a cellular sheet of a density of 0.085 g/cm³ having a uniform fine cellular structure and being white in color.

When the same procedure was repeated except that there was used an azodicarbonamide of a decomposition temperature of 210°C and an ash content of 0.03% prepared by not using any metal compound, there was obtained a cellular sheet having large cells and small cells and light yellow-colored surfaces.

EXAMPLE 18

Preparation of Plasticized PVC Foam

A 0.3 mm thick partially expanded plasticized polyvinyl chloride sheet was formed in a conventional manner from a blend of 100 parts of polyvinyl chloride, 80 ride or oxide of a metal selected from the group consisting of chromium, manganese, zinc, cobalt, nickel, tungsten, aluminum and tin; said oxidation reaction being conducted at a temperature of from 30° to 85° C.

2. A process as defined in claim 1 in which the metallic compound is water soluble and its concentration in the reaction mixture is 15 to 50% by weight.

3. A process as defined in claim 1 in which the metallic compound is a water insoluble and its concentration in the reaction mixture is 0.1 to 5% by weight.

4. A process as defined in claim 1 in which the bromine compound is a member selected from the group consisting of bromine, hydrogen bromide, water-soluble metallic bromides, ammonium bromide and organic bromides.

5. A process as defined in claim 1 in which the bromine compound is used in an amount of 0.1 to 5 parts be weight per 100 parts by weight of hydrazodicarbonamide.

6. A process as defined in claim 1 in which the bromine compound is used in an amount of 0.5 to 2 parts by weight per 100 parts by weight of hydrazodicarbonamide.

7. A process as defined in claim 1 in which the hydrogen peroxide is used in an amount of 1.0 to 2.0 mole per mole of hydrazodicarbonamide.

8. A process as defined in claim 1 in which the acid is sulfuric acid and its concentration is 10 to 40% by weight.

9. A process as defined in claim 1 in which the concentration of hydrazodicarbonamide in 5 to 45% by weight.

10. A process as defined in claim 1 in which the concentration of hydrazodicarbonamide is 15 to 30% by weight.

11. The precess as defined in claim 1 in which the reaction temperature is 30° to 60°C.

* * * * *